United States Patent
Oshima et al.

(10) Patent No.: US 9,637,097 B2
(45) Date of Patent: May 2, 2017

(54) VEHICLE CONTROL DEVICE

(71) Applicant: KAWASAKI JUKOGYO KABUSHIKI KAISHA, Kobe-shi, Hyogo (JP)

(72) Inventors: Takeru Oshima, Irvine, CA (US); Hideto Yoshitake, Akashi (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 15/202,453

(22) Filed: Jul. 5, 2016

(65) Prior Publication Data

US 2016/0311415 A1  Oct. 27, 2016

Related U.S. Application Data (63) Continuation of application No. PCT/JP2014/050221, filed on Jan. 9, 2014.

(51) Int. Cl.
 *B60B 39/00* (2006.01)
 *B60T 8/17* (2006.01)
 *B62J 99/00* (2009.01)

(52) U.S. Cl.
 CPC .......... *B60T 8/1706* (2013.01); *B62J 99/00* (2013.01); *B60T 2270/10* (2013.01)

(58) Field of Classification Search
 CPC .................... B60T 8/1706; B62J 99/00
 See application file for complete search history.

(56) References Cited

U.S. PATENT DOCUMENTS

| | | | |
|---|---|---|---|
| 8,560,173 B2 | 10/2013 | Matsuda | |
| 8,812,174 B2 | 8/2014 | Ohshima et al. | |
| 2007/0050193 A1* | 3/2007 | Larson | G07C 5/0841 701/99 |
| 2009/0112389 A1* | 4/2009 | Yamamoto | B60C 23/0401 701/31.4 |

(Continued)

FOREIGN PATENT DOCUMENTS

| | | |
|---|---|---|
| JP | 05-069848 | 3/1993 |
| JP | 2013-028279 | 2/2013 |

(Continued)

OTHER PUBLICATIONS

English Language Translation of the International Preliminary Report on Patentability Issued Jul. 21, 2016 for PCT/JP2014/050221 (5 pages).

(Continued)

*Primary Examiner* — Adam Alharbi (57) ABSTRACT

A control device for a motorcycle includes a removal detecting unit for detecting the removal of an equipment, which is required during a public road running of the automotive vehicle, from the motorcycle, a determining unit for determining the presence of the motorcycle on a non-public road area in the event that a determining condition including a detection signal fed from the removal detecting unit is satisfied, and a drive control unit operable in response to a determining signal from the determining unit to set a non-public road mode appropriate to the non-public road running. The equipment referred to above is at least one of a back viewing mirror, a headlight, a tail lamp, a number plate, a license lamp, a warning horn, a side stand and turn indicators.

14 Claims, 5 Drawing Sheets

(56) References Cited

U.S. PATENT DOCUMENTS

| | | |
|---|---|---|
| 2013/0030604 A1 | 1/2013 | Ohshima et al. |
| 2013/0030649 A1 | 1/2013 | Matsuda |
| 2013/0311075 A1* | 11/2013 | Tran ................... B60W 30/09 701/117 |
| 2016/0214675 A1* | 7/2016 | DeCordova .............. B62M 6/45 |

FOREIGN PATENT DOCUMENTS

| | | |
|---|---|---|
| JP | 2013-028294 | 2/2013 |
| JP | 2013-086632 | 5/2013 |

OTHER PUBLICATIONS

International Search Report for PCT/JP2014/050221, filed on Jan. 9, 2014 (4 pages).

* cited by examiner

VEHICLE CONTROL DEVICE

CROSS REFERENCE TO THE RELATED APPLICATION

This application is a continuation application, under 35 U.S.C §111(a) of international patent application No. PCT/JP2014/050221, filed Jan. 9, 2014.

BACKGROUND OF THE INVENTION

Field of the Invention

The present invention relates to a control device for an automotive vehicle capable of running on both of a public road and a non-public road area such as, for example, a circuit.

Description of Related Art

In automotive vehicles such as, for example, motorcycles, an automotive vehicle having an antilock brake system mounted thereon has been well known such as disclosed in the patent document 1 listed below. The antilock brake system is capable of avoiding an undesirable skidding on a road surface as a result of the wheel being locked when the automotive vehicle is abruptly braked or on a road surface having a low friction.

RELATED DOCUMENT

Patent Document

Patent Document 1: JP Laid-open Patent Publication No. 2013-028294

When the automotive vehicle is driven on the non-public road area such as, for example, the circuit, it is quite often that the driver does not wish to rely on the antilock brake system. However, a substantial amount of cost will be incurred when an automotive vehicle capable of running on both the public road area and the non-public road area is made available in the market, and, therefore, the convenience is worse when the automotive vehicle is remodeled so that it can run on both the public road area and the non-public road area.

SUMMARY OF THE INVENTION

In view of the foregoing, the present invention has for its object to provide a control device for an automotive vehicle with which the automotive vehicle can be switched into one of two different operative modes, that is, a public road mode and a non-public road mode.

In order to accomplish the foregoing object of the present invention, a control device designed in accordance with the present invention for use in the automotive vehicle includes: a removal detecting unit to detect removal of an equipment, which is required in the automotive vehicle when running on a public road, from the automotive vehicle; a determining unit to determine the presence of the automotive vehicle on a non-public road area in the event a determining condition including a detection signal fed from the removal detecting unit is satisfied; and a drive control unit operable to set the automotive vehicle to a non-public mode appropriate for running on the non-public road in response to a determination signal, fed from the determining unit. The non-public road mode referred to above is a selectable mode in which the antilock brake system can be rendered to be disabled or held in operative suppression. The non-public road mode includes change of a display of a meter unit or display of a switch dedicated for use during running on the non-public road.

According to the construction described above, when the equipment of the automotive vehicle, which is required when running on the public road, but can be removed when running on a non-public road, is removed from the automotive vehicle, the non-public road mode suitable during running on the non-public road can be selected. Accordingly, with no need to perform any special operation, the automotive vehicle can be changed for use in running on the non-public road.

In the practice of the present invention, the equipment referred to above may be at least one of back viewing mirrors, a headlamp, a brake lamp, a tail lamp, a number plate, a license lamp, a warning horn, a side stand, and turn indicators. In such case, the determining condition referred to above may include removal of two of those equipment. Accordingly, it is possible to avoid an erroneous operation which may result in change of the automotive vehicle to that for use in running on the non-public road.

In the practice of the present invention, the control device may include a non-public road area detecting unit to detect the presence of the automotive vehicle on the non-public road area, in which case the determining condition referred to above also includes a detection signal fed from the non-public road area detecting unit. According to this construction, by the use of both of the detection of removal of the equipment and the detection of the presence on the non-public road area as the determining condition, it is possible to avoid any change to the use for the run on the non-public road as a result of an erroneous detection. Transmission of the signal from the non-public road area detecting unit may be accomplished either wireless or by wire.

In the present invention, a mount detecting unit is preferably provided to detect mounting of a component for use on the non-public road area, on the automotive vehicle, in which case the determining condition includes a detection signal fed from the mount detecting unit. It is to be noted that the term "component for use on the non-public road area" referred to above and hereinafter is to be understood as meaning, for example, ECU for use on a circuit or an identification key. According to this construction, with the mounting of the component for use on the non-public road area added to the determining condition, it is possible to avoid the possibility that the automotive vehicle is changed to the use on the non-public road running as a result of an erroneous detection.

In the present invention, the equipment referred to above is an electric appliance or component, and the removal detecting unit referred to above is preferably operable to detect the removal of the equipment in reference to a detection signal fed from a behavior detecting unit mounted on the automotive vehicle for detecting the behavior of the electric appliance. According to the above described construction, there is no need to use an extra sensor as the removal detecting unit and an undesirable increase of the number of components can therefore be suppressed. The behavior detecting unit referred to above detects a change in electric power consumption/a change in electric voltage of an electric bulb, separation of a power supply line, the presence or absence of the side stand and so on. Also, in place thereof, the removal of the equipment referred to above may be detected in reference to a signal fed from a sensor used to detect the removal of the equipment.

A method of controlling the automotive vehicle designed in accordance with the present invention is a control method for the automotive vehicle having a drive assistance device mounted thereon, which method includes: a removal detecting step of detecting removal of a predetermined equipment from the automotive vehicle; a determining step of determining the presence of the automotive vehicle on a non-public road area in the event that a determining condition including a detection signal generated during the removal detecting step is satisfied; and a selecting or selectable step of rendering the drive assistance device to be disabled or operatively suppressed in response to a determination signal generated from the determining step.

According to the construction discussed above, when the predetermined equipment for the automotive vehicle is removed, the drive assistance device then running on the non-public road can be disabled or operatively suppressed. Accordingly, with no need to exert a special maneuver, the automotive vehicle can be changed for use on the non-public road running.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

A preferred embodiment of the present invention will now be described with particular reference to the accompanying drawings. In describing the present invention, however, the terms "left" and "right" or similar notations, that are used hereinabove and hereinafter, are to be understood as relative terms descriptive of positions and/or direction as viewed from a driver maneuvering an automotive vehicle while occupying the seat during the forward travel of the automotive vehicle.

Figure 1:
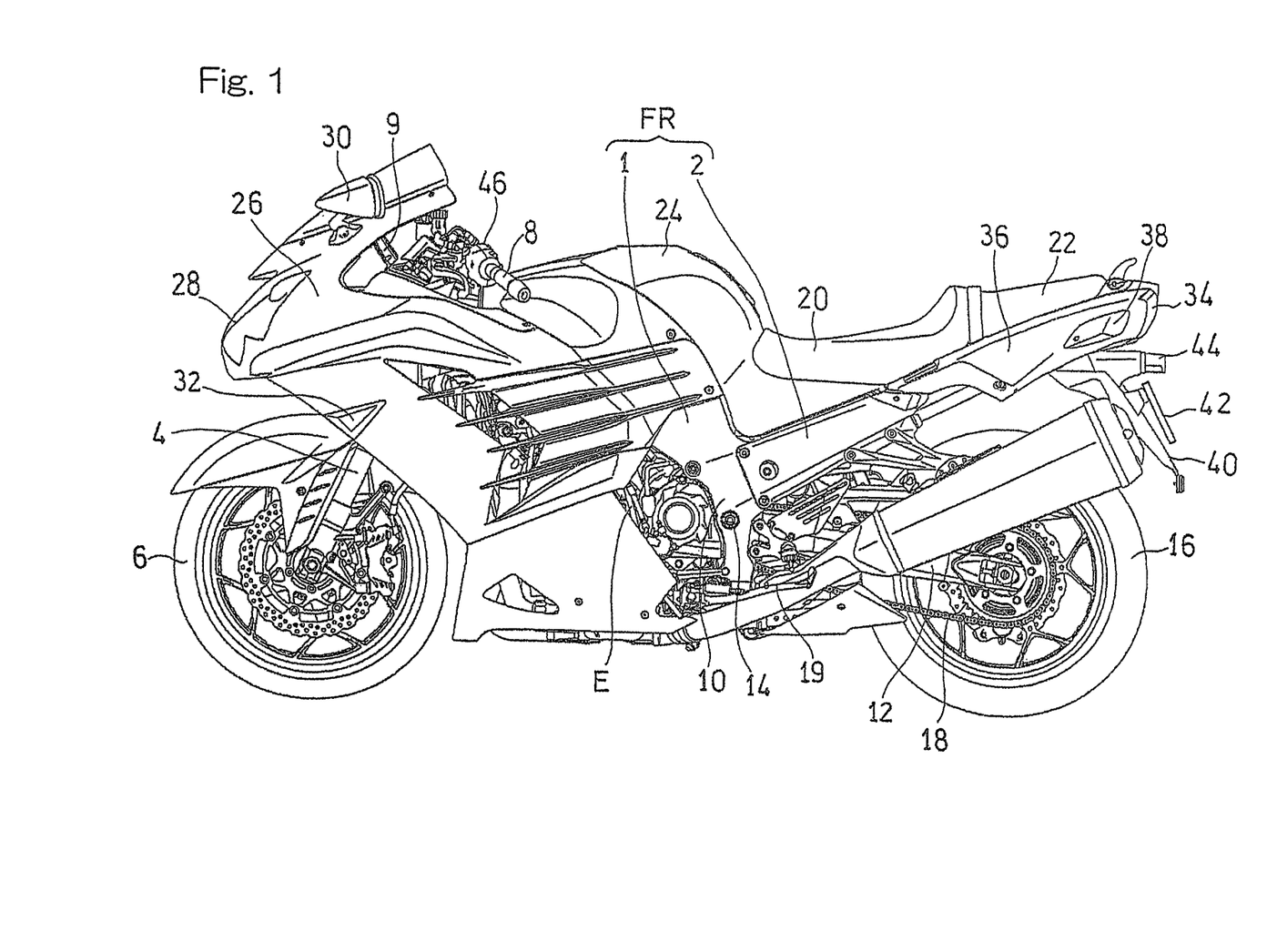
FIG. 1 is a side view showing a motorcycle, which is one of various automotive vehicles designed in accordance with a preferred embodiment of the present invention.

FIG. 1 illustrates a side view of a motorcycle, which is one of various automotive vehicles designed in accordance with the preferred embodiment of the present invention. The motorcycle shown therein includes a motorcycle frame structure FR made up of a front half frame substructure, including a main frame 1, and a rear half frame structure including a rear frame 2 that is connected with a rear portion of the main frame 1. A front fork 4 is supported by a front end of the main frame 1, and a front wheel 6 is fitted to a lower end of the front fork 4. A handlebar 8 and a meter unit 9 are fitted to an upper end of the front fork 4.

The main frame 1 has a rear end lower portion provided with a swingarm bracket 10. A swingarm 12 has a front end supported by the swingarm bracket 10 for pivotal movement in an up and down direction or in a vertical direction. This swingarm 12 has a rear end to which a rear wheel 16 is fitted. A motorcycle combustion engine E is fitted to a lower portion of the main frame 1, and is drivingly connected with the rear wheel 16 through an endless chain 18 to drive the rear wheel 16. Also, a side stand 19 is supported at a lower end portion of the main frame 1 at a location on a left side of the motorcycle.

A rider's seat 20 and a fellow passenger's seat 22 are supported by the rear frame 2. A fuel tank 24 is fitted to an upper portion of the main frame 1, that is, at a location between the handlebar 8 and the rider's seat 20.

A cowling or fairing 26 is supported by a main frame 1 so as to enclose an area forwardly of the handlebar 8 to portions on respective sides of the combustion engine E. The cowling 26 has a front end portion on which a headlight 28 is mounted, and left and right back viewing mirrors 30 are fitted to an upper portion of the cowling 26. Also, at a portion of the cowling 26 beneath the headlight 28, left and right front turn indicators 32 are fitted.

The rear frame 2 has a tail lamp 34 fitted to a rear end thereof. A portion of the rear frame 2 beneath the fellow passenger's seat 22 is enclosed by left and right rear cowls 36 externally from lateral sides. Left and right rear turn indicators 38 are mounted on a rear portion of the rear cowl 36 and supported by the rear frame 2. A rear flap 40 is supported by a rearward lower portion of the rear frame 2. A number plate 42 is fitted to the rear flap 40, and a license lamp 44 for illuminating the number plate 42 is fitted to an upper portion of the rear flap 40.

Figure 2:
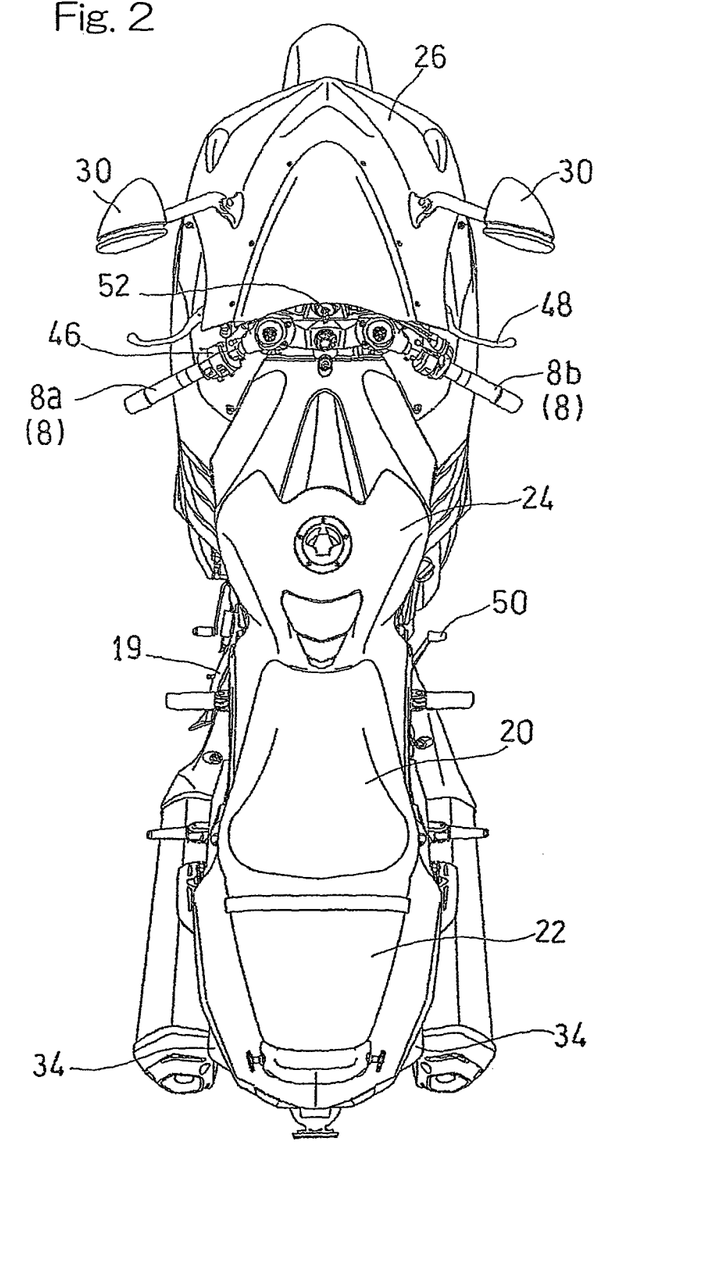
FIG. 2 is a top plan view of the motorcycle shown in FIG. 1.

As shown in FIG. 2, a mode selector switch 46 for changing a driving mode (running mode) of the motorcycle is fitted to a left handlebar segment 8a of the handlebar 8. This mode selector switch 46 is operable to select one of the driving modes such as, for example, a mode associated with the output or a mode associated with a traction control performance for alleviating an idle rotation of a tire during the start or acceleration of the motorcycle, which driving mode affects the motorcycle operating feeling. The output associated with the output referred to above includes, for example, a full power mode and a low power mode. A brake lever 48 is fitted to a right handlebar segment 8b, and a brake pedal 50 is disposed on a right side of the motorcycle at a location below the rider's seat 20. A main switch 52 for initiating the operation of the motorcycle is disposed forwardly of the handlebar 8.

The motorcycle according to the present preferred embodiment is a so-called full cowl type in which the front portion of the motorcycle in its entirety is enclosed by the cowling 26, and is suitably used in running not only on the public road, but also on the non-public road area such as the circuit. The motorcycle according to the present preferred embodiment has an antilock brake system ABS mounted thereon, which ABS is one of types of drive assistance device for assisting the maneuvering by the driver.

Figure 3:
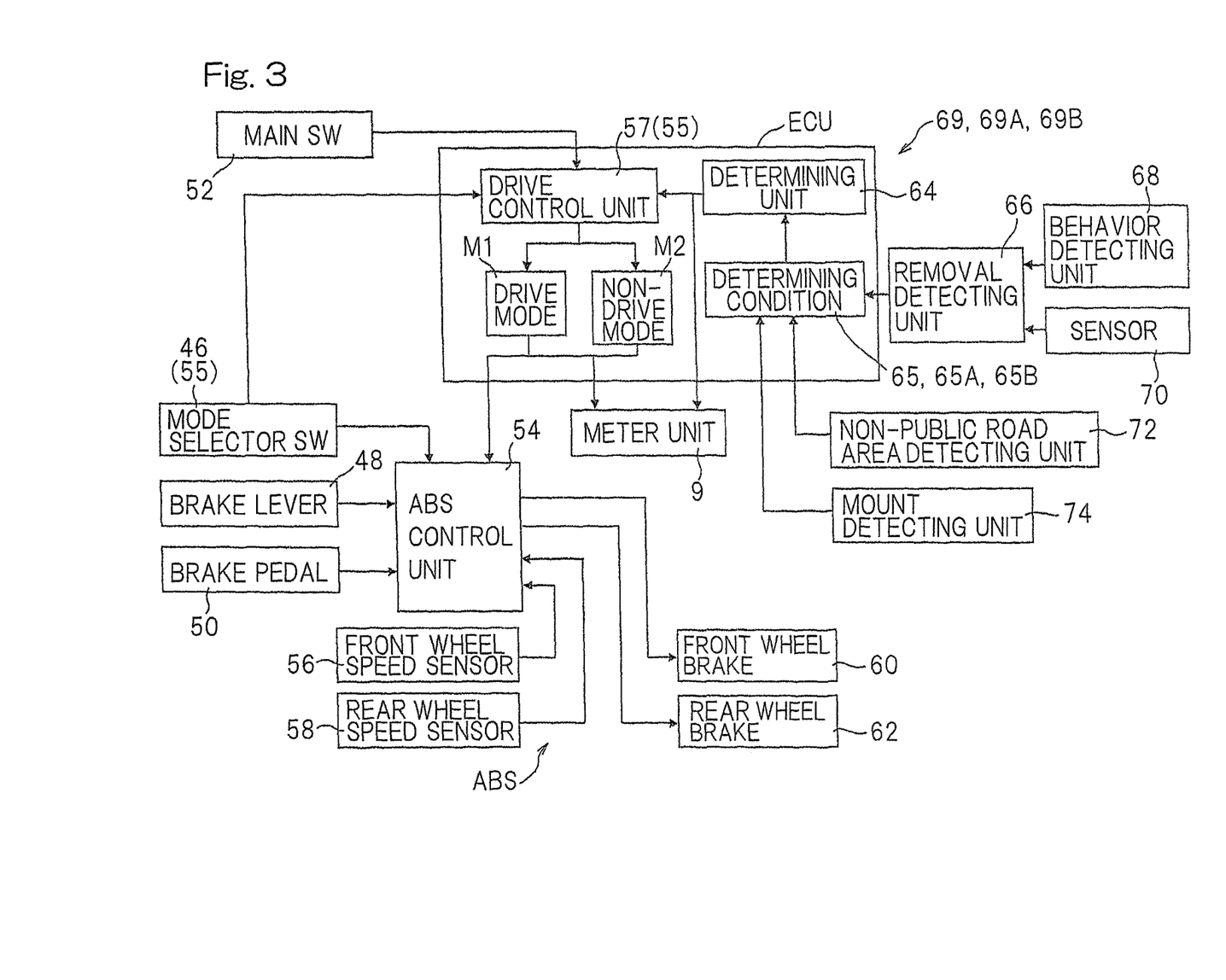
FIG. 3 is a structural diagram of a control device used in the motorcycle.

As shown in FIG. 3, the antilock brake system ABS includes an ABS control unit 54, and respective signals from a front wheel speed sensor 56 and a rear wheel speed sensor 58 are inputted to the ABS control unit 54. Braking maneuvers from the brake lever 48 and the brake pedal 50 are transmitted respectively to a front wheel brake 60 and a rear wheel brake 62 through the ABS control unit 54. On the basis of the respective signals from the wheel speed sensors 58 and 60, the ABS control unit 54 activates each of the brakes 60 and 62 so as to prevent the motorcycle wheels from being locked and then skidding on the road surface during the braking operation.

The drive assistance device detects a vehicle condition or a driver's manipulation and, in the event that a condition that requires a drive assisting control is determined on the basis of the result of such a detection, issues an operation assisting command to a control target. The control target referred to above includes an electronically controllable device which will affects the running feeling. As the control target, a driving device such as, for example, the engine or an electric motor, a braking device such as the brakes, a cushioning device such as a suspension, steering device, a power transmitting device and so on may be included.

Specifically, the drive assistance device may include, besides the antilock brake system ABS, a traction control (a start assistance device and/or a low friction road running support device), an electronic control suspension, CBS (a front and rear wheel cooperation brake system), an automatic transmission device, an electronically controlled steering damper, an idling stop, an output regulation, a wheel speed regulation, a collision originating damage retarding brake or an automatic operation or the like.

Also, the drive assistance device is preferably of a type in which an electronically controllable actuator or a sensor is mounted for accomplishing the drive assistance. This type of actuator may include, for example, an electronically controllable hydraulic unit, which may be used in the antilock brake system or the front and rear wheel cooperation brake system or the like, an electronically controlled suspension and an electronically controlled steering damper.

The motorcycle employed in the practice of the present preferred embodiment is provided with a determining unit 64 which determines the presence of the motorcycle on the non-public road area. In the practice of this embodiment, the determining unit 64 is employed in the form of a program loaded in an engine control unit ECU. This determining unit 64 is operable to determine the presence on the non-public road area when a protective appliance for the motorcycle is removed. The protective device referred to above means a statutorily required equipment, which is one of equipment required when running on the public road area, for the sake of security and may be, for example, a warning sound horn (not shown), the back viewing mirrors 30, the headlamp 28, turn indicators 32 and 38, the tail lamp 34 or the like. The equipment required during the running on the public road may be, besides the protective device refereed above, the number plate 42, the license lamp 44, the side stand 19 and so on.

A determining condition 65, under which the determining unit 64 determines the presence of the motorcycle on the non-public road area, includes a condition in which at least one of the protective devices referred to above is removed. In place of the protective devices, removal of the previously discussed equipment including the protective devices may be rendered to be the determining condition 65. In such case, removal of two or more of the previously discussed equipment may be included as the determining condition 65. Thereby, it is possible to avoid the possibility of determining that the motorcycle may be present on the non-public road area as a result of an erroneous operation. The removal of the equipment including the protective devices is detected by a removal detecting unit 66.

In the event that the equipment is employed in the form of an electric component, the removal detecting unit 66 detects removal of the equipment in reference to a detection signal fed from a behavior detecting unit 68 that is mounted on the motorcycle for the purpose of detecting the motion of the electric component. The behavior detecting unit 68 referred to above is operable to detect, for example, the ratio of the "change in electric power consumption/change in electric voltage" of an electric bulb, breakage of the power supply line and/or a side stand sensor or the like.

Figure 4:
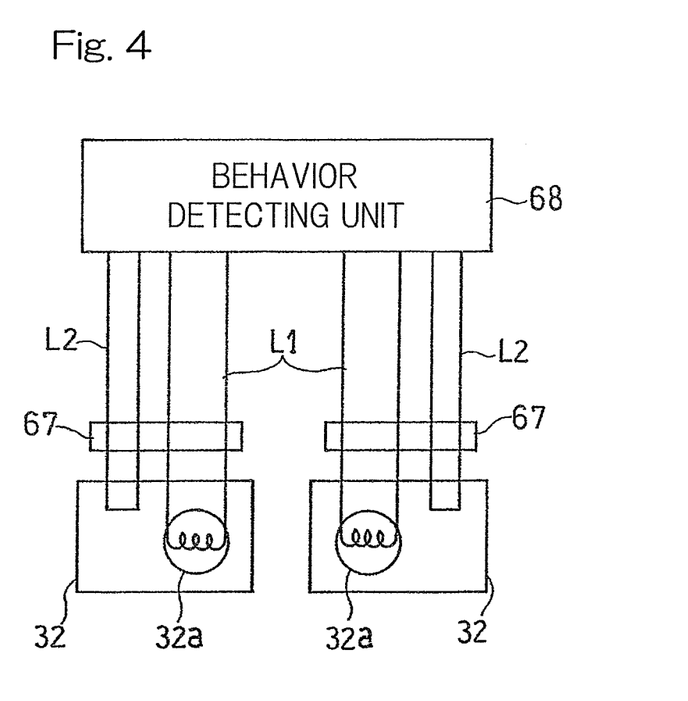
FIG. 4 is a block circuit diagram showing a behavior detecting unit which is one of electric components used in the motorcycles.

FIG. 4 shows one example of the behavior detecting unit 68. Each of the left and right front turn indicators 32 is provided, besides an electric power line L1 for respective light emitting elements 32a, with a detection line L2 for the purpose of removal detection, and the behavior detecting unit 68 is connected with this detection line L2. A connector 67 is interposed on each of the power supply line L1 and the detection line L2. When with the connectors 67 having been separated from the front turn indicators 32 are removed from the motorcycle, the behavior detecting unit 68 detects breakage of the power supply line L1 and the detection line L2 to thereby issue respective detection signals. In this way, when the detection line L2 is provided separate from the power supply line L1, it is possible to avoid such an erroneous operation as to detect the breakage of the electric bulbs as removal of the front turn indicators 32.

Where the equipment shown in FIG. 3 is not an electric component such as the back viewing mirror 30, the number plate 42 or the like, the provision is made of a sensor 70 for detecting the removal of such equipment so that the removal of the equipment can be detected on the basis of a signal from this sensor 70. The sensor 70 referred to above may be employed in the form of, for example, a mechanical contact switch or a reflection type photo-sensor. The determining unit 64 determines that the motorcycle is present on the non-public road area when the determining condition 65 including the detection signal from the removal detecting unit 66 is satisfied.

The determining condition 65 referred to above may include, in addition to the detection signal from the removal detecting unit 66 as discussed above, a condition that the motorcycle is running at a speed not higher than a predetermined speed or in a running halt condition. Also, the determining condition 65 may include the slip ratio descriptive of idle rotation of either of the front and rear wheels, the motorcycle speed, the acceleration degree, the deceleration degree or the like. In other words, based on those motorcycle running condition, the motorcycle is deemed as running on the non-public road area and, hence, the condition descriptive of the presence on the non-public road area may be set in the determining condition 65. Also, the determining condition 65 may be defined so that during the execution of the assisting control, a mode change may be invalidated. When the determining condition 65 is so defined as discussed above, the reduction of the running feeling can be avoided.

The motorcycle according to the present preferred embodiment is equipped with a selector unit 55 capable of selecting the antilock brake system to one of a public road mode M1 and a non-public road mode M2 when the presence of the motorcycle on the non-public road area is determined by the determining unit 64. So long as the presence on the non-public road area is not determined, the antilock brake system ABS cannot be selected to the non-public road mode M2. In other words, only when the motorcycle is determined as present on the non-public road area, the antilock brake system ABS can be selected to the non-public road mode M2. The selector unit 55 is so constructed that the driver can make the selection during a motorcycle run enabled condition. In the practice of the present preferred embodiment, the selector unit 55 is comprised of the mode selector switch 46 and a drive control unit 57 which is the program contained in the engine control unit ECU.

The motorcycle run enabled condition referred to above is to be understood as including a motorcycle halted condition. This motorcycle run enabled condition is so defined that, before and after the operation, a motorcycle run disabled condition such as, for example, the removal of a motorcycle mounted component will not be passed and is, for example, a condition in which, as a result of the main switch 52 (ignition switch) having been manipulated, the electric power supply to the electric component is permitted is maintained. Also, the selector unit 55 referred to above is preferably of a structure that can be selected by the driver while the latter is riding. A switch used in an application other than the mode selection may be used concurrently with the selector unit 55.

The mode selector switch 46 includes a plurality of selector switches, and the drive control unit 57 determines the selection of the non-public road mode M2 when a plurality of switching manipulations of the mode selector switch 46 are accomplished. In the case where the mode selector switch 46 is comprised of a single selector switch, the selection of the non-public road mode M2 may be determined when the switch is manipulated for a period longer than a predetermined length of time.

More specifically, by simultaneously manipulating two switches, which are provided on left and right sides, respectively, for a period longer than the predetermined length of time, the mode selecting operation is carried out. Alternatively, while the condition, in which the mode can be selected, is attained by manipulating a mode selector button provided in the meter unit 9 or in a handle switch, the selector button may be used to accomplish the mode selection. Any erroneous operation can be avoided by setting such a mode selecting operation that takes place not by a single operation, but through a plurality of steps and/or providing a wait time.

The mode selector switch 46 referred to above may be of any switch that can be disposed at a manipulatable position while the driver rides on the motorcycle, and may be employed in the form of, for example, a selector switch for the driving mode, a selector switch for a meter display mode, or a switch for the running maneuver (for example, a switch for turn indicators, a switch for horns, a beam high-low switching switch for lamps or the like). By concurrently utilizing the existing switch that can be manipulatable during the riding, the cost of manufacture can be reduced with no need to employ any separate switch.

When the non-public road mode M2 is selected, the antilock brake system ABS is disabled. In place thereof, with the non-public road mode M2, the efficacy of the antilock brake system ABS is, for example, lowered. Alternatively, change may be made to allow the antilock decision to be retarded. Again alternatively, when the non-public road mode M2 is selected, the brake operation assistance by means of either one of the hydraulic units for the front and rear wheels may be disabled. As discussed above, during the non-public road mode M2, as compared with that during the public road mode M1, the drive assistance amount by means of the control device is suppressed or disabled. Thereby, a motorcycle behavior appropriate to the driver's operation can be attained. When the non-public road mode M2 is selected, only the antilock brake system ABS for the rear wheel may be dispensed with.

Also, when the non-public road mode M2 is selected, the display through the meter unit 9 may be changed for running on the non-public road, or a switch exclusively for use running on the non-public road may be displayed on the meter unit 9. As a display of the meter unit 9 when the non-public road mode M2 is selected, the display which is counted in the non-public road area may be given priority. More specifically, the engine rotational number may be displayed in preference to the display of the motorcycle running speed, or the gear shifting position and/or the lap time may be displayed emphatically. Also, a selection screen image may be displayed so that the non-public road mode M2 may be selected. In details, a screen image is displayed which shows a selector switch for the non-public road mode M2 that can be selected by means of manipulation, and also the selected mode is displayed.

The control device 69 for the motorcycle is constituted including the removal detecting unit 66, the determining unit 64, the selector unit 55 and the drive control unit 57.

The meter unit 9 referred to previously displays, when the determining unit 64 determines the presence of the motorcycle on the non-public road area, such an indication that the public road mode M1 and the non-public road area M2 can be selectable. The meter unit 9 further displays, when the non-public road mode M2 is selected by the selector unit 55, such an indication that the non-public road mode M2 is being selected.

In other words, in the practice of the present preferred embodiment, when the presence on the non-public road area is determined and the selecting operation is performed by the driver, the drive assistance device is changed from the public road mode M1 over to the non-public road mode M2. By changing the drive assistance device over to the non-public road mode M2 through the driver's affirmative mode selecting operation in the manner described above, the driver can easily recognize the change of mode.

Even though the assistance performed by the drive assistance device is changed to the non-public road mode as described above, the motorcycle can be driven by the maneuver, performed by the driver. The drive assistance device, which enables the selection of the non-public road mode in the event that the motorcycle is present on the non-public road area, is preferably so set that, in the event of the presence of the motorcycle on the public road area, the non-public road mode may be unable to be changed.

The drive assistance device referred to above is preferably operable to carry out the drive assistance during running on the public road area is obligatory or required at the present or in future years. With the drive assistance device so designed as described above, there is no need to purchase any automotive vehicle, for example, motorcycle dedicated for use on the non-public road area. Also, since it is possible to run on the public road area and then to move onto the non-public road area, there is no need to transport the dedicated automotive vehicle to the non-public road area and, hence, the convenience can be increased. The antilock brake system ABS employed in the practice of the present preferred embodiment may be occasionally required by law when travelling on the public road.

Figure 5:
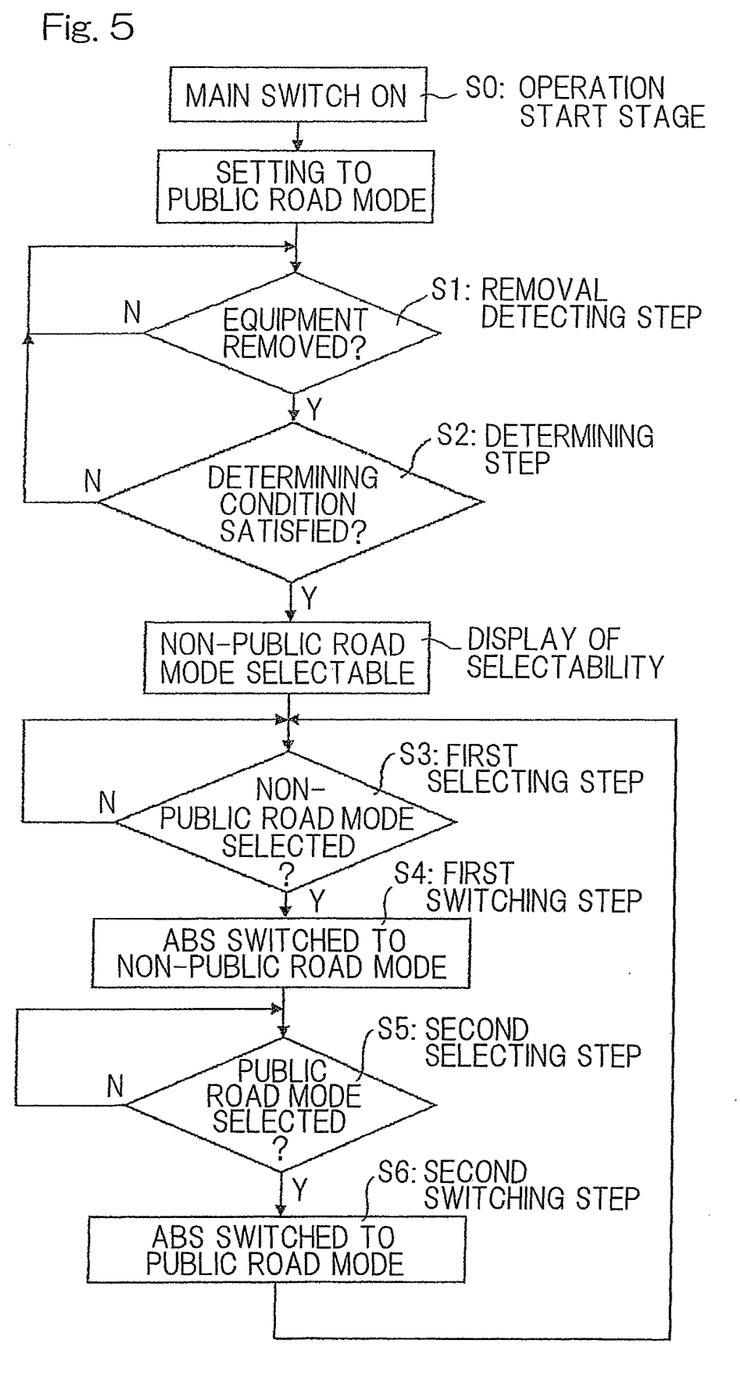
FIG. 5 is a flow chart showing the sequence of operation of the control device.

With particular reference to FIG. 5, a vehicle control method with the use of the control device 69, that is, a drive assistance method of the motorcycle will be described. The drive assistance method according to the present preferred embodiment includes a removal detecting step S1, a determining step S2, a first selecting step S3, and a first switching step S4 as detailed subsequently.

At an operation start stage S0 in which the main switch 52 is turned on, the public road mode M1 is selected, followed by the removal detecting step S1. Before the public road mode M1 is changed over to the non-public road mode M2, the public road mode M1 is sustained.

At the removal detecting step S1, when the removal of the protective component or the mounted equipment referred to previously is detected, the determining step S2 follows. The removal detecting step S1 is sustained by the time the removal of the protective component or the mounted equipment is detected removed. At the determining step S2, when the determining condition 65 including the detection signal at the removal detecting step S1 is satisfied, the presence of the motorcycle on the non-public road area is determined and, hence, the non-public road mode is allowed to be selectable. If at this determining step S2 the determining condition 65 is not satisfied, the process returns to the removal detecting step S1.

The non-public road mode selectable condition is a condition in which selection from the public road mode M1 to the non-public road mode M2 is possible, and is followed by the first selecting step S3. During the non-public road mode selectable condition, for example, the selection image screen descriptive of the selection of the non-public road mode M2 is displayed on the meter unit 9 and, at the same time, the switching operation to change to the non-public road mode M2 is validated. In other words, in the event that the non-public road mode selectable condition is not passed through, the switching operation even if executed is invalidated and no mode change is executed. Immediately after the shift to the non-public road mode selectable condition, the status that the public road mode M1 has been selected is displayed on the meter unit 9.

At the first selecting step S3, if the switching operation to the non-pubic road mode M2 is carried out by the driver, the process goes to the first switching step S4. The first selecting step S3 is sustained by the time the switching operation is carried out.

AT the first switching step S4, in response to the selection of the non-public road mode M2 during the first selecting step S3, switching is made to disable the antilock brake system ABS. Other than the selection of the non-public road mode M2 at the first selecting step S3, the antilock brake system ABS remains under the public road mode M1. At the first switching step S4, the switching of the antilock brake system ABS to the non-public road mode M2 is performed, and also the selected mode is displayed on the meter unit 9, followed by a second selecting step S5.

At the second selecting step S5, when the return operation is carried out by the driver back to the public road mode M1, the process goes to the second switching step S6. At the second switching step S6, the antilock brake system ABS is switched to the public road mode M1 and the selected mode is displayed on the meter unit 9. The program subsequently returns to the first selecting step S3.

When at each of the steps S1 to S5 the main switch 52 is switched off, a terminating operation takes place. Therefore, when the main switch 52 is again switched on, the public road mode M1 is again selected, followed by the removal detecting step S1. In other words, when the motorcycle starts, it starts from the public road mode M1 by all means. Accordingly, in the event of switching to the non-public road mode M2, each time the starting initiation takes place in the motorcycle, a driver should have an affirmative will to select onto the non-public road mode M2. Thereby, even when during the previous run the main switch 52 is turned off while the non-public road mode M2 is maintained, it is possible to avoid resumption of the drive assistance device undesirably under the non-public road mode M2.

In the construction hereinabove described, due to the employment of the selector unit 55 shown in FIG. 3, when the driver selects the non-pubic road mode M2 on the non-public road area, the antilock brake system ABS can be disabled and, therefore, the convenience of the motorcycle increases. Also, other than the case in which the determining unit 64 determines that the motorcycle is present on the non-public road area, the selection of the non-public road mode M2 is impossible and, hence, it is possible to avoid an undesirable release of the antilock brake system ABS.

The selector unit 55 referred to above is constituted by the mode selector switch 46 with which the driver can make the selection during the motorcycle run enabled condition. Accordingly, with no need to dismantle the motorcycle, the non-public road mode M2 can be easily selected and, therefore, the convenience can be increased.

Also, the selector unit 55 selects the antilock brake system ABS to the public road mode M1, when the main switch 52 for starting the motorcycle is operated. Therefore, even though the drive operation is previously terminated under the condition of the non-public road mode M2, the public road mode M1 is started when the next drive reopening take places. For this reason, it is possible to avoid the antilock brake system ABS from being disabled when the motorcycle runs on the public road.

When the determining unit 64 determines that the motorcycle exists on the non-public road area, the meter unit 9 displays an indication that selection of the public road mode M1 and the non-public road mode M2 can be selectable, and, also, displays, in the event of the selection of the non-public road mode M2, an indication that the non-public road mode M2 is now selected. Accordingly, that the non-public road mode M2 is selectable can be affirmed with naked eyes and, therefore, the convenience is increased further, and also the driver can be aroused that the motorcycle is now under the non-public road mode M2.

During the run on the public road, by the operation of the mode selector switch 46 for selecting the driving mode (running mode), the drive control unit 57 determines the selection of the non-public road mode M2. Therefore, no use of any extra switch is needed for the selector unit 55.

The drive control unit 57 referred to above determines the selection of the non-public road mode M2 when the plurality of switching operations are performed. Therefore, it is possible to avoid the selection of the non-public road mode M2 by means of an erroneous operation of the driver.

The determining unit 64, when the protective component of the motorcycle or the equipment (including the protective component) is removed, determines the non-public road area. As such, the presence on the non-public road area can be determined when the protective component or the equipment (including the protective component) necessary when running on the public road area but unnecessary when running on the non-public road area is removed. Therefore, the motorcycle can be changed to that for use on the non-public road without any special operation being performed. More specifically, during the run on the non-public road the antilock brake system can be disabled. Thereby, the convenience is further increased.

In the case where the protective component (equipment) is an electric component, the removal detecting unit 66 detects the removal of the equipment from a detection signal, fed from the behavior detecting unit 68 mounted on the motorcycle for detecting the behavior of the electric component. Accordingly, there is no need to use any extra sensor that functions as the removal detecting unit 66 and an undesirable increase of the number of component parts can be suppressed. Where the equipment is not the electric component, the removal of the equipment can be detected by a signal fed from the sensor 70 for detecting the removal of the equipment.

As a control device 69A designed in accordance with a first modification of the control device 69 discussed hereinbefore, provided is a second non-public road area detecting unit 72 for detecting the presence of the motorcycle on the non-public road area besides the removal of the component, and the determining condition 65A includes a detection signal fed from the second non-public road area detecting unit 72. This second non-road area detecting unit 72 is a device capable of determining the presence of the motorcycle in the non-public road area with the use of both of a unit for detecting the current position of the motorcycle such as a satellite global positioning system, GPS and a geographic information stored beforehand. Transmission of a signal from the non-public road area detecting unit 72 may be accomplished by either wire or wireless.

According to the above described first modification, by the use of the two signals, one from the removal detecting unit 66 and the other from the non-public road detecting unit 72, as the determining condition 65A, any erroneous detection can be avoided.

As a control device 69B designed in accordance with a second modification of the control device 69 discussed hereinbefore, in place of the second non-public road detecting unit 72 or in addition to the second non-public road detecting unit 72, included is a mount detecting unit 74 for detecting that a component which is utilized by the motorcycle only on the non-public road area, and a determining condition 65B includes a detection signal fed from this mount detecting unit 74. The component that is utilized only on the non-public road area includes, for example, a control unit for the circuit, a circuit certificate key, a competitor's number plate or the like. The mount detecting unit 74 outputs a signal indicative of the non-public road area when the engine control unit ECU is replaced with the control unit for the circuit or when an identification key is inserted into a key switch unit.

According to the above described second modification, with the use of both of the signal from the removal detecting unit 66 and the signal from the mount detecting unit 74 as the determining conditions 65B, it is possible to prevent, as a result of an erroneous detection, from changing the motorcycle to the non-public mode.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the preferred embodiment of the present invention as set forth above, reference has been made to the use of the antilock brake system as the drive assistance device, the present invention is not necessarily limited thereto and is generally applicable to any control in which maneuver interposition control in any way is generated to the maneuver performed by the driver. Specifically, the drive assistance device may be a traction control which is effective to avoid an idle rotation of the tire during the start and acceleration, an electronic control suspension, an output regulation or the like. The drive assistance device is so constructed as to suppress the maneuver interposition during the non-public road mode as compared with that during the public road mode.

When the non-public road mode is selected, light emitting components such as, for example, the turn indicator 32 and 38, the brake lamp 34, position lamps and so on may not be lit. By so doing, when the motorcycle runs erroneously on the public road while selecting the non-public road mode, the driver can be reminded to such error.

Also, although in describing the preferred embodiment of the present invention as set forth above, the use has been shown and described as the detecting line L2 separate from the power supply line L1 shown in FIG. 4, with the behavior detecting unit 68 connected with those lines L1 and L2. However, without the use of the detecting line L2, only the power supply line L1 may be connected with the behavior detecting unit 68. Although in the foregoing embodiment described hereinbefore, the determining unit 64 and the selector unit 55 have been shown and described as contained in the engine control unit ECU, the present invention is not necessarily limited to that and they may be contained in, for example, the meter unit 9.

Again, although in describing the preferred embodiment of the present invention as set forth above, the public road mode M1 has been described as selected when the main switch 52 is turned on, such an arrangement may be satisfactory that at the time of the operation start to drive the engine E from a halted condition the public road mode M1 is selected. For example, in the event that decision is made of run completion at the time the main switch 52 is turned off or the like, storage is made to allow the public road mode M1 to be stored as a mode assumed at the subsequent operation start. Also, arrangement may be made that during the period in which the engine E is rotating, the selected mode may be sustained. Furthermore, when a predetermined time elapses during which the run halted condition continues after the non-public road mode M2 has been selected by the selector unit 55, the public road mode M1 may be resumed.

The structure may be so configured that the non-public road mode M2 may be selected from one of a plurality of options, not from one stage that eliminate the use of the drive assistance. More specifically, for example, a plurality of modes having varying degrees of drive assistance is prepared, one of the plurality of options may be selected by the selection done by the driver. By so doing, on that particular occasion of the non-public road area, the drive assistance preferred by the driver can be selected.

Although in describing the preferred embodiment of the present invention as set forth above, reference has been made to the determination of the motorcycle on the non-public road area, but arrangement may be made that only when detecting the presence of the motorcycle on the area for which the predetermined mode can be selected, the driver can select the mode of the drive assistance device. In such case, effects brought about by the above described embodiment can be attained even on the public road and in the area that is exceptionally treated as the non-public road. Further, the selection of the driving mode may be invalidated during running on either of a freeway or a general road. Also, of the public road, where the area (country, area) in which the installation of the drive assistance device is compulsory exist, arrangement may be made that the mode of the drive assistance device can be selected in the area excluding such area.

Although in describing the preferred embodiment of the present invention as set forth above, the case has been discussed in which the mode of the drive assistance device can be selected only when the presence of the motorcycle on the non-public road area is determined, a reverse operation may be done. In other words, in the event of the presence of the motorcycle in the area in which the installation of the drive assistance device is compulsory is determined, the selection of the mode of the drive assistance device is invalidated or disabled and the mode (public road mode) of a predetermined drive assistance device may be executed.

While in the practice of the preferred embodiment of the present invention, it has been described that the driver riding on the motorcycle can select the mode of the drive assistance device, arrangement may be made that the driver in an exited condition can select it. Specifically, for example, a mode changing switch may be held within a ditty bag or provided underneath the seat. Accordingly, when changing the mode, it is possible to avoid the driver from conducting a mode switching operation undesirably.

Where a device capable of detecting the position of the motorcycle such as, for example GPS is mounted, the presence of the motorcycle on the non-public road area may be determined with the use of such device. Also, the non-public road area may be determined by storing the non-public road code, which is a descriptive of the non-public road area, in advance and comparing the stored non-public road code with a code fed from the outside of the motorcycle. Such non-public road code may be encrypted or may be received through wire or wireless.

A switch portion of the selector unit 55 may not be necessarily limited to the mode selector switch 46, and may be a switch provided in, for example, the meter unit 9. In describing the preferred embodiment of the present invention as set forth above, reference has been made to the motorcycle, but the present invention can be equally applied to any automotive vehicle other than the motorcycle.

Accordingly, such changes and modifications are, unless they depart from the scope of the present invention as delivered from the claims annexed hereto, to be construed as included therein.

REFERENCE NUMERALS

19 . . . Side stand (Equipment)
28 . . . Headlamp (Equipment)
30 . . . Back viewing mirror (Equipment)
32 . . . Front turn indicator (Equipment)
34 . . . Tail lamp (Equipment)
38 . . . Rear turn indicator (Equipment)
42 . . . Number plate (Equipment)
44 . . . License lamp (Equipment)
57 . . . Drive control unit
64 . . . Determining unit
66 . . . Removal detecting unit
65 . . . Determining condition
68 . . . Behavior detecting unit
72 . . . Non-public road area detecting unit
74 . . . Mount detecting unit
ABS . . . Antilock brake system
S1 . . . Removal detecting step
S2 . . . Determining step
S3 . . . Selector unit

What is claimed is:

1. A control device for an automotive vehicle, which comprises:
    a removal detecting unit to detect removal of an equipment, which is required in the automotive vehicle when running on a public road, from the automotive vehicle;
    a determining unit to determine the presence of the automotive vehicle on a non-public road area in the event a determining condition including a detection signal fed from the removal detecting unit is satisfied;
    a selection image screen displaying when a non-public road mode appropriate for running on the non-public road is selectable by a driver of the automotive vehicle;
    a mode selector unit enables the driver to select the non-public road mode; and
    a drive control unit operable to set the automotive vehicle to the non-public road mode in response to a determination signal, fed from the determining unit and a selection of the non-public road mode.

2. The control device of the automotive vehicle as claimed in claim 1, in which the equipment is at least one of a back viewing mirror, a headlight, a brake lamp, a tail lamp, a number plate, a license lamp, a warning horn, a side stand and a turn indicator.

3. The control device for the automotive vehicle as claimed in claim 2, in which the determining condition includes removal of two or more equipment.

4. The control device for the automotive vehicle as claimed in claim 1, further comprising a non-public road area detecting unit to detect the presence of the automotive vehicle on the non-public road area, wherein the determining condition includes a detection signal fed from the non-public road area detecting unit.

5. The control device for the automotive vehicle as claimed in claim 1, further comprising a mount detecting unit to detect mounting of a component for use on the non-public road area, on the automotive vehicle, wherein
    the determining condition includes a detection signal fed from the mount detecting unit.

6. The control device for the automotive vehicle as claimed in claim 1, wherein the equipment is an electric appliance, and
    the removal detecting unit is operable to detect the removal of the equipment in reference to a detection signal from a behavior detecting unit mounted on the automotive vehicle for detecting the behavior of the electric appliance.

7. The control device for the automotive vehicle as claimed in claim 1, in which the removal detecting unit detects removal of the equipment in reference to a signal fed from a sensor to detect the removal of the equipment.

8. The control device for the automotive vehicle as claimed in claim 1, in which the non-public road mode includes a selectable mode to enable an antilock brake system to be disabled or behavior suppression.

9. A method of controlling an automotive vehicle equipped with an drive assistance device, which comprises:
    a removal detecting step of detecting removal of a predetermined equipment from the automotive vehicle;
    a determining step of determining the presence of the automotive vehicle on a non-public road area in the event that a determining condition including a detection signal generated during the removal detecting step is satisfied;
    a display step of displaying a determination of the non-public road area to a driver of the automotive vehicle;

a mode selector step that enables the driver to select a non-public road mode appropriate for running on the non-public road area displayed by the display step; and a selecting step of rendering the drive assistance device to be disabled or operatively suppressed in response to a selection of the non-public road mode in the mode selector step and the determination signal generated from the determining step.

10. A control device for a motorcycle comprising:

a determining unit to determine the presence of the motorcycle on a non-public road area and providing a detection signal of the non-public road area;

a meter unit for providing a visible non-public road area display to a driver of the motorcycle when the detection signal is provided by the determining unit;

a mode selector unit enables the driver to select a non-public road mode for running on the non-public road; and a drive control unit operable to set the motorcycle to the non-public road mode in response to the detection signal of the non-public road area after the driver selects the non-public road mode with the mode selector unit.

11. The control device for a motorcycle as claimed in claim 10 wherein the mode selector unit includes a selectable mode to also disable an antilock brake system when the non-public road mode is selected by the driver.

12. The control device for a motorcycle as claimed in claim 10 wherein the determining unit includes a satellite global positioning system to determine the non-public road area relative to pre-stored geographic information.

13. The control device for a motorcycle as claimed in claim 10 wherein light emitting components on the meter unit such as turn indicators, brake lamp and position lights are not lit in the non-public road mode.

14. The control device for a motorcycle as claimed in claim 10 wherein the determining unit determines a removal of one or more pieces of equipment required for travel in a public road mode of operation in determining the non-public road area.

* * * * *